US008638796B2

(12) United States Patent
Dan et al.

(10) Patent No.: US 8,638,796 B2
(45) Date of Patent: Jan. 28, 2014

(54) RE-ORDERING SEGMENTS OF A LARGE NUMBER OF SEGMENTED SERVICE FLOWS

(75) Inventors: Yie-Fong Dan, Cupertino, CA (US); Edmund Au, Cupertino, CA (US); Raymond Ng, Sunnyvale, CA (US); Yanyan Cui, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 376 days.

(21) Appl. No.: 12/196,880

(22) Filed: Aug. 22, 2008

(65) Prior Publication Data
US 2010/0046519 A1  Feb. 25, 2010

(51) Int. Cl.
*H04L 12/56* (2011.01)

(52) U.S. Cl.
USPC .......................................................... 370/394

(58) Field of Classification Search
None
See application file for complete search history.

(56) References Cited

U.S. PATENT DOCUMENTS

| | | | |
|---|---|---|---|
| 6,438,140 B1 * | 8/2002 | Jungers et al. ................. | 370/471 |
| 6,700,896 B1 * | 3/2004 | Beshai ............................ | 370/427 |
| 6,781,992 B1 * | 8/2004 | Rana et al. ..................... | 370/394 |
| 7,245,615 B1 * | 7/2007 | Potter et al. .................... | 370/389 |
| 2003/0036400 A1 * | 2/2003 | Casaccia ........................ | 455/515 |
| 2004/0004964 A1 * | 1/2004 | Lakshmanamurthy et al. ................................ | 370/394 |
| 2004/0141494 A1 * | 7/2004 | Beshai et al. .................. | 370/352 |
| 2004/0213291 A1 * | 10/2004 | Beshai et al. .................. | 370/473 |
| 2005/0129020 A1 * | 6/2005 | Doyle et al. ................... | 370/392 |
| 2006/0088030 A1 * | 4/2006 | Beeson et al. ................. | 370/389 |
| 2007/0008985 A1 * | 1/2007 | Lakshmanamurthy et al. ................................ | 370/412 |
| 2007/0223483 A1 * | 9/2007 | Huang et al. .................. | 370/394 |
| 2008/0084873 A1 * | 4/2008 | Pullen et al. ................... | 370/352 |

OTHER PUBLICATIONS

"Data-Over-Cable Service Interface Specifications (DOCSIS) 3.0—Security Specification, CM-SP-SECv3.0-I08-080522"; Cable Television Laboratories, Inc., May 22, 2008.
"Data-Over-Cable Service Interface Specifications (DOCSIS) 3.0—Cable Modem to Customer Premise Equipment Interface Specification, CM-SP-CMCIv3.0-I01-080320"; Cable Television Laboratories, Inc., Mar. 20, 2008.
"Data-Over-Cable Service Interface Specifications (DOCSIS) 3.0—Physical Layer Specification, CM-SP-PHYv3.0-I07-080522"; Cable Television Laboratories, Inc., May 22, 2008.
"Data-Over-Cable Service Interface Specifications (DOCSIS) 3.0—MAC and Upper Layer Protocols Interface Specification, CM-SP-MULPIv3.0-I08-080522"; Cable Television Laboratories, Inc., May 22, 2008.
"Data-Over-Cable Service Interface Specifications (DOCSIS) 3.0—Operations Support System Interface Specification, CM-SP-OSSIv3.0-I07-080522"; Cable Television Laboratories, Inc., May 22, 2008.
"Data-Over-Cable Service Interface Specifications (DOCSIS) 3.0—Management Features Differences Technical Report, CM-TR-MGMTv3.0-DIFF-V01-071228"; Cable Television Laboratories, Inc., Dec. 28, 2007.
"Data-Over-Cable Service Interface Specifications (DOCSIS) 3.0—OSSI Configuration Management Technical Report, CM-TR-OSSIv3.0-CM-V01-080926"; Cable Television Laboratories, Inc., Sep. 26, 2008.

* cited by examiner

*Primary Examiner* — Gregory Sefcheck
*Assistant Examiner* — Steve Young

(57) ABSTRACT

A method and network device for re-ordering segments of a segmented data stream. The method includes receiving at least two segments of a segmented data stream. A descriptor for each of the at least two segments is obtained, and the at least two segments are re-ordered to generate re-ordered segments, where the re-ordered segments are in an original order. A set of re-ordered segments are processed to obtain at least one data packet, where at least one descriptor is utilized in the processing of the set of re-ordered segments.

20 Claims, 9 Drawing Sheets

RE-ORDERING SEGMENTS OF A LARGE NUMBER OF SEGMENTED SERVICE FLOWS

BACKGROUND

1. Field

The present disclosure relates generally to cable modem communication systems and, more particularly, to a network device for re-ordering segments of segmented flows of a data stream.

2. Related Art

Continuous increasing demand for broadband services has given rise to the development of multiple technologies, such as Digital Subscriber Line (DSL), Wi-Max, Digital Multimedia Broadcasting (DMB), and the like, to support the rising demand. In addition, Data over Cable Service Interface Specification (DOCSIS) technologies are rapidly gaining importance among cable system users to provide high-speed data transmission for broadband services.

DOCSIS provides a standard specifying communication and operation support requirements for cable modems (CMs) and the supporting systems to provide high-speed data transmission for services, such as internet access (e.g., video streaming, online gaming, downloading/uploading web content, and the like), as well as cable television (CATV) services to end users. In order to support such high-speed data transmission, the latest version of DOCSIS, DOCSIS 3.0, specifies a Continuous Concatenation and Fragmentation (CCF) feature, also called channel bonding. Channel bonding allows a CM at a user location to fragment a data packet stream into multiple segments and transmit these segments over different channels to a centralized cable modem termination system (CMTS). Additionally, a CMTS may employ channel bonding to generate and transmit a segmented data stream to a downstream CM. By using multiple channels to transmit segments of a data stream, the bandwidth of the cable system is significantly increased and optimally utilized.

However, differences in the properties of a transmission media at different frequencies, varied routing distances of segments, processing time required for switches within the route, and the like, may cause varying delays, such as propagation delay, transmission delay, and/or the like, for segments transmitted over different channels. Accordingly, consecutive segments transmitted over different channels may reach the end terminal (i.e., the CM or CMTS) at different intervals of time. Moreover, during transmission, one or more segments may be "lost" in the communication channel and never arrive at the end terminal. These delays and lost segments detrimentally impact the accuracy and/or quality of the communication between a CM and a CMTS.

Therefore, there is a need in the art to efficiently process received segments of a segmented data stream to retrieve the original data packets from the received segments.

BRIEF DESCRIPTION OF THE DRAWINGS

The Figures in the appended drawings, like the detailed description, comprise examples. As such, the Figures and the detailed description are not to be considered limiting, and other equally effective examples are possible and likely. Furthermore, like reference numerals in the Figures indicate like elements, and wherein.

DESCRIPTION OF EXAMPLE EMBODIMENTS

Overview

A method and network device for re-ordering segments of a segmented data stream are disclosed. The method includes receiving at least two segments of a segmented data stream. A descriptor for each of the at least two segments is obtained, and the at least two segments are re-ordered to generate re-ordered segments, where the re-ordered segments are in an original order. A set of re-ordered segments are processed to obtain at least one data packet, where at least one descriptor is utilized in the processing of the set of re-ordered segments.

Detailed Description

Figure 1:
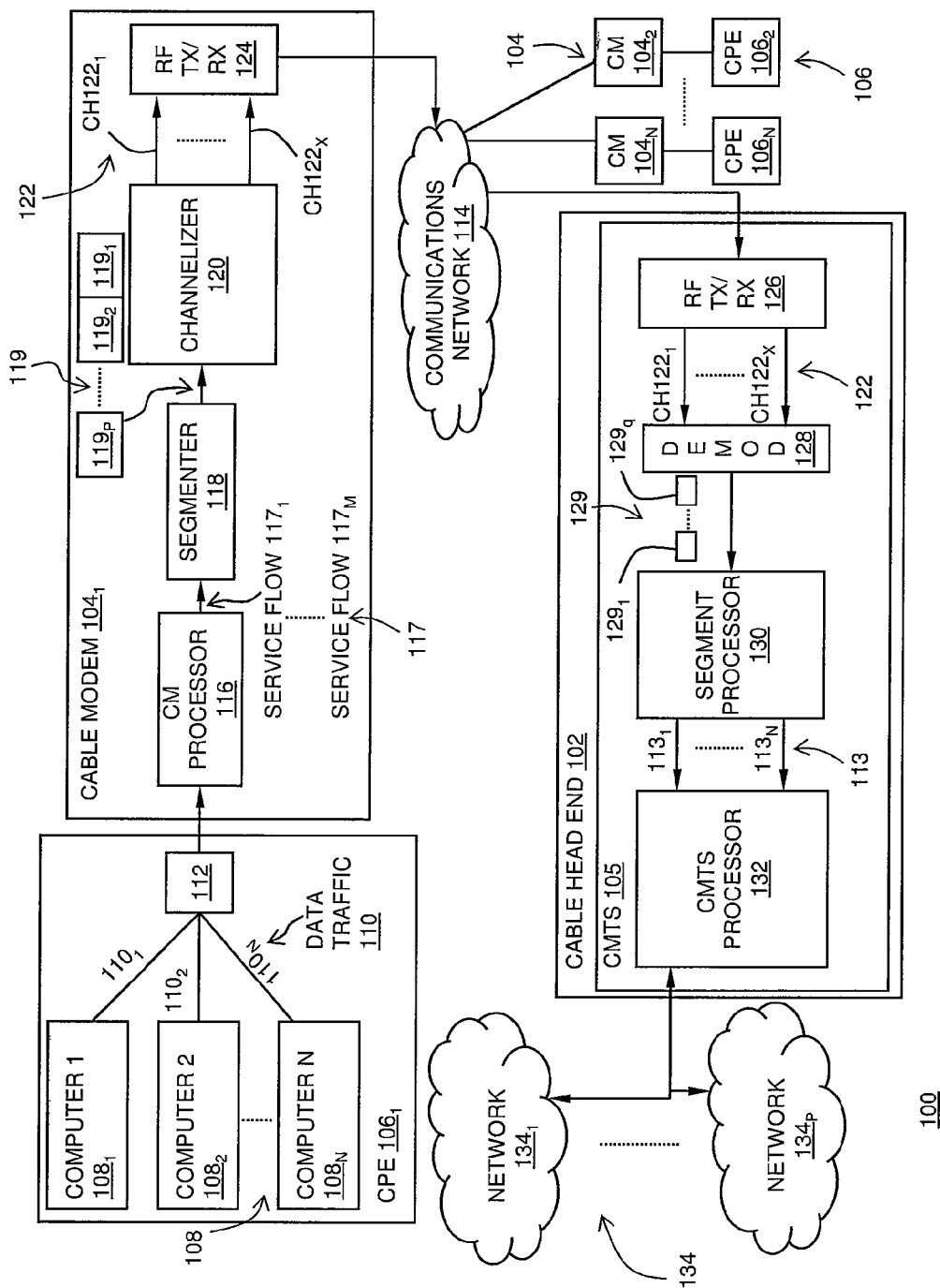
FIG. 1 is a block diagram illustrating an example of a cable system employing channel bonding.

FIG. 1 is a block diagram illustrating an example of a cable system 100 employing channel bonding. The system 100 employs a plurality of CMs 104 and a CMTS 105 to facilitate high speed data services via a network 114, such as broadband internet access, access to Local Area Networks or Wide Area Networks, and the like, to end users. Additionally, the system 100 may provide cable television access to the end users.

The system 100 includes a cable head end 102 and CMs $104_1, 104_2, \ldots, 104_n$, hereinafter referred to as CMs 104. The CMs 104 are communicably coupled to the cable head end 102 via the network 114. The cable head end 102 includes a Cable Modem Terminating System (CMTS) 105 for managing the operation and functionality of the CMs 104; the CMTS 105 may manage on the order of tens of thousands of CMs. For purposes of illustration, an upstream transmission from the CM 104 to the CMTS 105 is depicted in FIG. 1. Further, additional CMTSs may be located at the cable headend 102 to manage additional networks of CMs not depicted in FIG. 1.

The system 100 further includes customer premise equipment $106_1, 106_2, \ldots, 106_n$, hereinafter referred to as the customer premise equipment (CPE) 106. The CPE 106 may include multiple computers, such as a computer $108_1, 108_2, \ldots, 108_n$, hereinafter referred to as computers 108. Each computer 108 may be a computing device such as a desktop computer, a laptop, a mobile phone, a Personal Digital Assistant (PDA) and/or the like. Each computer 108 generates data traffic $110_1, 110_2, \ldots, 110_n$, hereinafter known as data traffic 110, for upstream transmission. The data traffic 110 may be comprised of one or more streams of data packets, where each stream of data packets corresponds to a session for a particular type of data service, such as video on demand, video conferencing, voice, and the like. Accordingly, the CPE 106 communicates the data traffic 110 to the CM 104 for upstream transmission to the CMTS 105.

The CM 104 is coupled to the CPE 106 and may be configured to communicate directly with the computer 108. Alternatively, the computers 108 may be coupled to a networking device 112, such as a router, a switch, a gateway, and the like, for communicating the data traffic 110 to the CM 104.

The CM 104 includes a CM processor 116 and a packet segmenter 118. The output of the CPE 106 is coupled to the CM processor 116. The CM processor 116 processes the received data traffic 110; for example, the CM processor 116 may provide internet protocol layer processing. The CM processor 116 and CMTS 105 establish one or more upstream service flows $117_1$, $117_2$ ..., $117_n$, hereinafter known as service flows 117, for each stream of data packets within the data traffic 110. Each service flow 117 has its own set of quality of service (QoS) parameters, such as bandwidth, priority, transit delay, and the like, based on the type of service of the stream of data packets. Additionally, one or more downstream service flows are established by the CM 104 and the CMTS 105 for transmitting downstream flows of data packet streams for different services.

Based on instructions from the CMTS 105, the packet segmenter 118 segments the received service flows 117 into sequentially ordered segments to generate a segmented data stream consisting of segments $119_1$, $119_2$, ..., $119_p$, hereinafter known as segments 119. The segments 119 may be of variable size but have a predefined Maximum Transmission Unit (MTU) based on the MTU of the system 100. For example, an MTU of two kilobytes (2 KB) may be utilized. The packet segmenter 118 may segment the service flows 117 at arbitrary byte boundaries; thus, a single data packet may span one or more segments 119. Consequently, a segment 119 may contain a "partial data packet", where the remainder of the partial packet is contained within one or more other segments 119. Alternatively and/or additionally, a segment 119 may contain one or more complete data packets. The segmenter 118 further includes a segment header in each segment 119, where the segment header includes a sequence number to identify the original order of the segments 119 within a particular service flow 117.

The CM 104 further includes a channelizer 120 and a first radio frequency (RF) transceiver 124. A plurality of transmission channels $122_1$, $122_2$ ..., $122_n$, hereinafter known as channels 122, are pre-established between the CM 104 and the CMTS 105 for data transmission. Each channel 122 is identified by a unique channel ID. The CM 104 receives instructions from the CMTS 105 regarding the channel 122 allocation for transmitting the segments 119. A Service ID (SID) is assigned to identify a particular service flow 117 that may use certain allocated bandwidth on a particular channel 122. Each service flow 117 is assigned a unique SID for each channel 122 it is assigned to use; however, for a particular service flow 117, the SID may vary from channel to channel. Accordingly, both the channel ID and the SID are required to identify a particular service flow 117 corresponding to a transmitted segment 119. Based on the CMTS instruction, the channelizer 120 assigns each segment to one of the channels 122 for transmission to the CMTS 105. Consequently, consecutive segments 119 of a segmented service flow 117 may be transmitted over different channels 122 to the CMTS 105 and may arrive at the CMTS 105 in an order different from their original order.

The channelizer 120 further includes modulators to modulate the frequencies of the channels 122 with the assigned segments 119. The output of the channelizer 120 is coupled to the input of the RF transceiver 124, and the RF transceiver 124 transmits the segmented data stream over the channels 122 via a coaxial cable to the network 114.

The network 114 comprises a communication system, such as a Hybrid Fiber Coaxial (HFC) network, that connects network devices by wire, cable, fiber optic and/or wireless link facilitated by various types of well-known network elements, such as hubs, switches, routers, and the like. The network 114 may employ various well-known protocols to communicate information amongst the network resources. For example, the network 114 may be a part of the internet or intranet using various communications infrastructure such as Ethernet, WiFi, WiMax, General Packet Radio Service (GPRS), and the like.

The CMTS 105 is generally located within the cable head end 102. Alternatively, the CMTS 105 may be configured to communicate remotely to the cable head end 102. Generally, the cable head end 102 couples the received segmented data stream to the CMTS 105. The CMTS 105 includes a second RF transceiver 126 and a demodulator 128.

The received segmented data stream is coupled to the RF transceiver 126, and the channels 122 at the output of the RF transceiver 126 are coupled to the demodulator 128. The demodulator 128 demodulates the signals carried by channels 122 and obtains the received segmented data stream, consisting of segments $129_1$, $129_2$, ..., $129_q$, hereinafter known as segments 129. Due to transmission delay differences among the channels 122, the received segments 129 may no longer be in the same sequence as the transmitted segments 119. Additionally, some of the transmitted segments 119 may not arrive at the CMTS 105 and thus may not be included in the received segments 129.

The CMTS 105 further includes a segment processor 130 and a CMTS processor 132. The demodulator 128 couples the received segments 129 to the segment processor 130. The segment processor 130 parses the segments 129 according to the service flow 117 from which the segment 129 originated, and further re-orders the segments 129 to their original order within the corresponding service flow 117. Additionally, the segment processor 130 retrieves the original data packets from the re-ordered segments 129 for each service flow 117 to generate the recovered data traffic $113_1$, $113_2$, ..., $113_n$, where the recovered data traffic $113_i$ corresponds to the data traffic $110_i$. The recovered data traffic $113_1$, $113_2$, ..., $113_n$, hereinafter known as recovered data traffic 113, is coupled to the CMTS processor 132. The CMTS processor 132 acts to route and transmit the recovered data traffic 113 to the appropriate end destination. For example, the recovered data traffic 113 may be communicated to a destination terminal via a network $134_1$, $134_2$, ..., $134_n$, hereinafter known as network 134. The network 134 may be that of one or more network service providers and comprise high capacity data links for transmitting the recovered data traffic 113.

Additionally and/or alternatively, downstream data transmission from the CMTS 105 to the CMs 104 may analogously employ channel bonding as described above, and therefore the CMTS 105 may comprise a packet segmenter 118 and a channelizer 120, and the CMs 104 may comprise a demodulator 128 and a segment processor 130.

Figure 2:
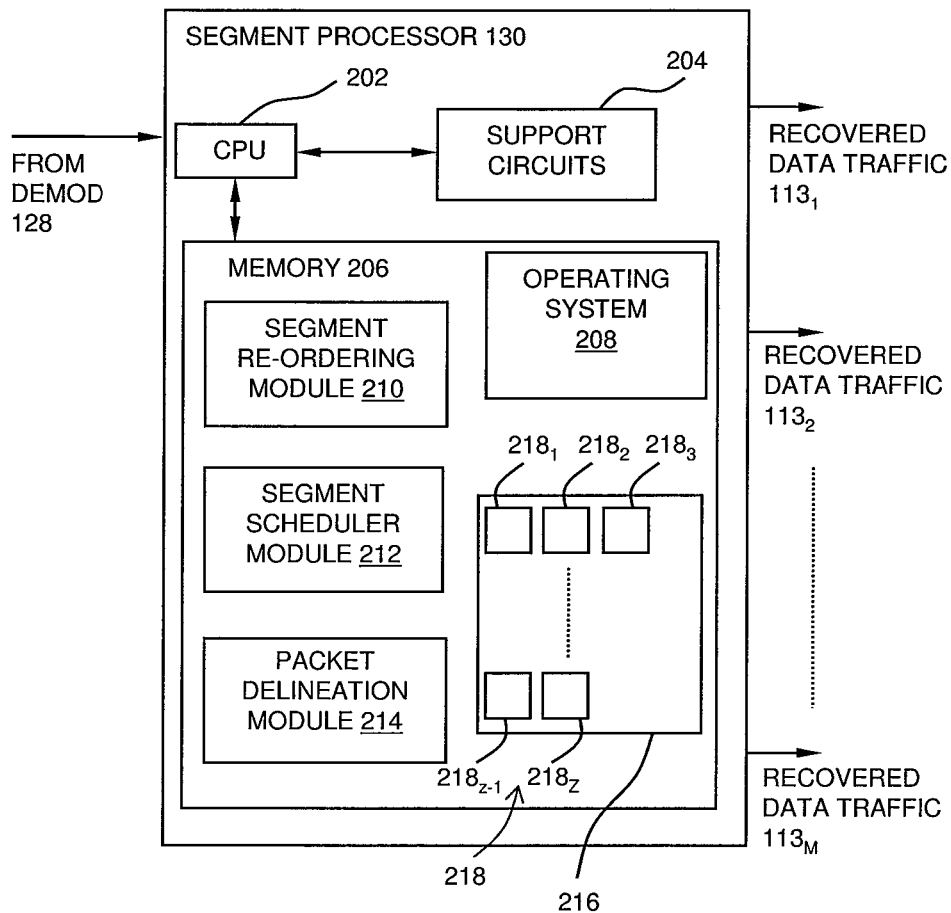
FIG. 2 is a block diagram illustrating an example of a segment processor.

FIG. 2 is a block diagram illustrating an example of a segment processor 130. The segment processor 130 includes a Central Processing Unit (CPU) 202, one or more support circuits 204, and a memory 206.

The CPU 202 may comprise one or more commercially available microprocessors or microcontrollers that facilitate data processing and storage. The support circuits 204 facilitate the operation of the CPU 202 and comprise at least one of clock circuits, power supplies, cache, input/output circuits, and the like. The memory 206 comprises at least one of a Read Only Memory (ROM), a Random Access Memory (RAM), disk drive storage, optical storage, removable storage, and the like. The memory 206 includes an embedded operating system 208 for operably controlling the software of the segment processor 130. Additionally, the memory 206 includes a segment re-ordering module 210, a segment scheduler module 212, a packet delineation module 214 and a buffer pool 216, where the buffer pool 216 consists of a plurality of fixed size buffers $218_1$, $218_2$, ..., $218_z$, hereinafter known as buffers 218, where each buffer 218 can store a complete segment 129. For example, a buffer 218 may be a 2 KB buffer. The segment processor 130 may be implemented in hardware, software, or a combination of hardware and software.

The segment re-ordering module 210 analyzes the received segments 129 and maps each received segment 129 to the service flow 117 from which the segment 129 originated. The segment re-ordering module 210 stores each received segment 129 in a buffer 218. Additionally, when a segment 129 is stored, the segment re-ordering module 210 generates and stores a descriptor for the segment 129. The descriptor includes relevant information about the segment 129; for example, the descriptor includes information about the segment 129 validity, packet structure and boundaries within the segment 129, and the location of the buffer 218 where the segment 129 is stored. For each service flow 117, the segment re-ordering module 210 re-orders the corresponding segments 129 to their original order. The segment re-ordering module 210 utilizes a series of tables to map each received segment 129 to its corresponding service flow 117 and to re-order the segments 129 to their original order, as described below in relation to FIGS. 3, 4, and 5. For each service flow 117, the segment re-ordering module 210 further determines ranges of re-ordered segments 129 to be examined by the segment schedule module 212 for processing to retrieve the original data packets. These ranges are determined based on a timeout process as further described below in relation to FIG. 5. The segment re-ordering module 210 may re-order the received segments 129 for a large number of service flows 117; for example, the segment re-ordering module 210 may handle the re-ordering of segments 129 for thousands of service flows 117 simultaneously.

Once a range of re-ordered segments 129, as determined by the segment re-ordering module 210, are ready for the segment schedule module 212, the segment scheduler module 212 examines the corresponding descriptors and, based on the descriptors, sends the appropriate segments 129 to the packet delineation module 214 for processing to retrieve the original data packets, as further described below in relation to FIG. 6.

The packet delineation module 214 processes the re-ordered segments 129 identified by the segment scheduler module 212 to obtain the original data packets, thus generating the recovered traffic 113.

Figure 3:
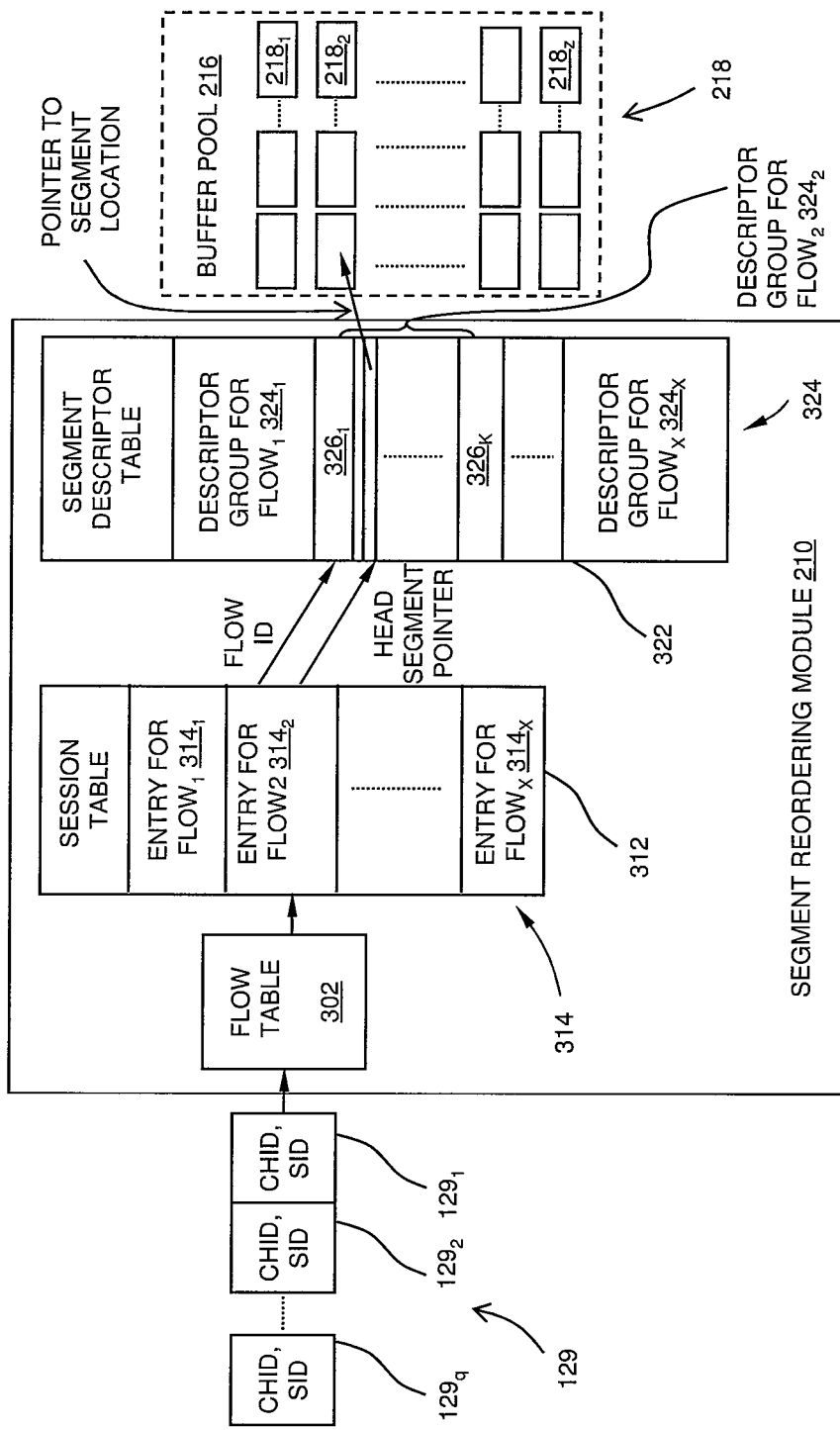
FIG. 3 is a block diagram 300 illustrating an example of a series of re-ordering tables within the segment re-ordering module 210 and a buffer pool 216 of the segment processor 130.

FIG. 3 is a block diagram 300 illustrating an example of a series of re-ordering tables within the segment re-ordering module 210 and a buffer pool 216 of the segment processor 130. The segment re-ordering module 210 includes a flow table 302, a session table 312, and a descriptor table 322. The session table 312 consists of a set of entries $314_1$, $314_2$, ..., $14_x$, hereinafter known as session entries 314. Additionally, the descriptor table 322 consists of descriptor groups $324_1$, $324_2$, ..., $324_x$, hereinafter known as descriptor groups 324. Each descriptor group 324 consists of consecutive descriptor entries $326_1$, $326_2$, ..., $326_k$, hereinafter known as descriptor entries 326.

The segment re-ordering module 210 receives the segments 129. The flow table 302 determines the service flow 117 from which each segment 129 originated, and maps the segment 129 to a unique Flow ID for the corresponding service flow 117. For example, the flow table 302 may utilize the channel ID, which uniquely identifies the channel 122 over which a segment 129 was transmitted, and the SID, which uniquely identifies a service flow 117 utilizing that particular channel 122, of the segment 129 to map the segment 129 to a Flow ID for its corresponding service flow 117. The flow table 302 thus allows segments 129, originating from the same service flow 117 but transmitted over different channels 122 (i.e., a channel bonded group), to be mapped to the same Flow ID.

Once the Flow ID for a segment 129 is identified, the flow table 302 points to a corresponding session entry 314 within the session table 312. Each session entry 314 corresponds to a single service flow 117 and tracks the reordering state of the segments 129 corresponding to that particular service flow 117. Each session entry 314 manages the resources, such as memory resources, hardware resources, and the like, allocated to the re-ordering of the segments 129 corresponding to a particular service flow 117. For example, a session entry 314 for Flow 2 identifies the next expected segment 129 with the smallest sequence number and the received segment 129 with the highest sequence number. Additionally, each session entry 314 manages one or more timeout sessions for one or more ranges of re-ordered segments 129 as further described below in relation to FIG. 5.

The descriptor table 322 includes a descriptor group 324 for each service flow 117 managed by the CMTS 105. For a particular service flow 117, the corresponding session entry 314 identifies the location of the corresponding descriptor group 324 within the descriptor table 322. For example, the Flow ID of a particular service flow 117 may point to the first descriptor entry 326 of the corresponding descriptor group 324 as a base address.

Each descriptor group 324 contains a predefined number of descriptor entries 326 to store the descriptors for segments 129 of the corresponding service flow 117. For example, each descriptor group 324 may contain 512 descriptor entries 326. Additionally, the descriptor entries 326 of each descriptor group 324 are organized as a circular First-In-First-Out (FIFO).

The descriptor table 322 provides a re-ordering mechanism to re-order the received segments 129 for each service flow 117. Each descriptor entry 326 of a descriptor group 324 acts to identify whether a particular segment 129 has, in fact, been received and is in the re-ordering process. Additionally, each consecutive descriptor entry 326 within a descriptor group 324 corresponds to a sequence number of a segment 129. For example, for a circular FIFO descriptor group 324 consisting of 512 descriptor entries 326, if the first descriptor entry $326_1$ corresponds to a segment 129 with sequence number "N", then the second descriptor entry $326_2$ corresponds to a segment 129 with sequence number "N+1", the third descriptor entry $326_3$ corresponds to a segment 129 with sequence number "N+2", and the like. In such an example, the last descriptor entry $326_{512}$ corresponds to a segment 129 with a sequence number "N+511", and the segment 129 with a sequence number "N+512" will be associated with the first descriptor entry $326_1$ in the descriptor group 324. Thus, as the descriptors for segments 129 are stored in the corresponding descriptor entries 326, the segments 129 are effectively re-ordered based on the order of the descriptor entries 326 in the descriptor group 324. Additionally, based on the descriptor entries 326 in a particular descriptor group 324, the segment re-ordering module 210 can track whether all segments 129 within one or more ranges of sequence numbers have been received within one or more time limits.

The segment scheduler module 212 detects a set of consecutive segments 129 is ready for packet retrieval by examining the descriptors associated with the set. When a set of re-ordered segments 129 is sent by the segment scheduler module 212 to the packet delineation module 214 for packet retrieval, the associated buffers 218 are emptied and returned to the buffer pool 216, and the corresponding descriptor entries 326 are flagged as "empty" for future reuse. Alternatively and/or additionally, the last segments 129 within the set of re-ordered segments 129 may contain a partial packet. In such a case, the partial packet is preserved within the associated buffer 218, and the corresponding descriptor is updated by the segment scheduler module 212. At a later time, when the segment 129 or segments 129 containing the remainder of the partial packet are sent to the packet delineation module 214, the partial packet can as well be sent at that time and the associated buffer 218 and descriptor entry 326 freed up.

Figure 4:
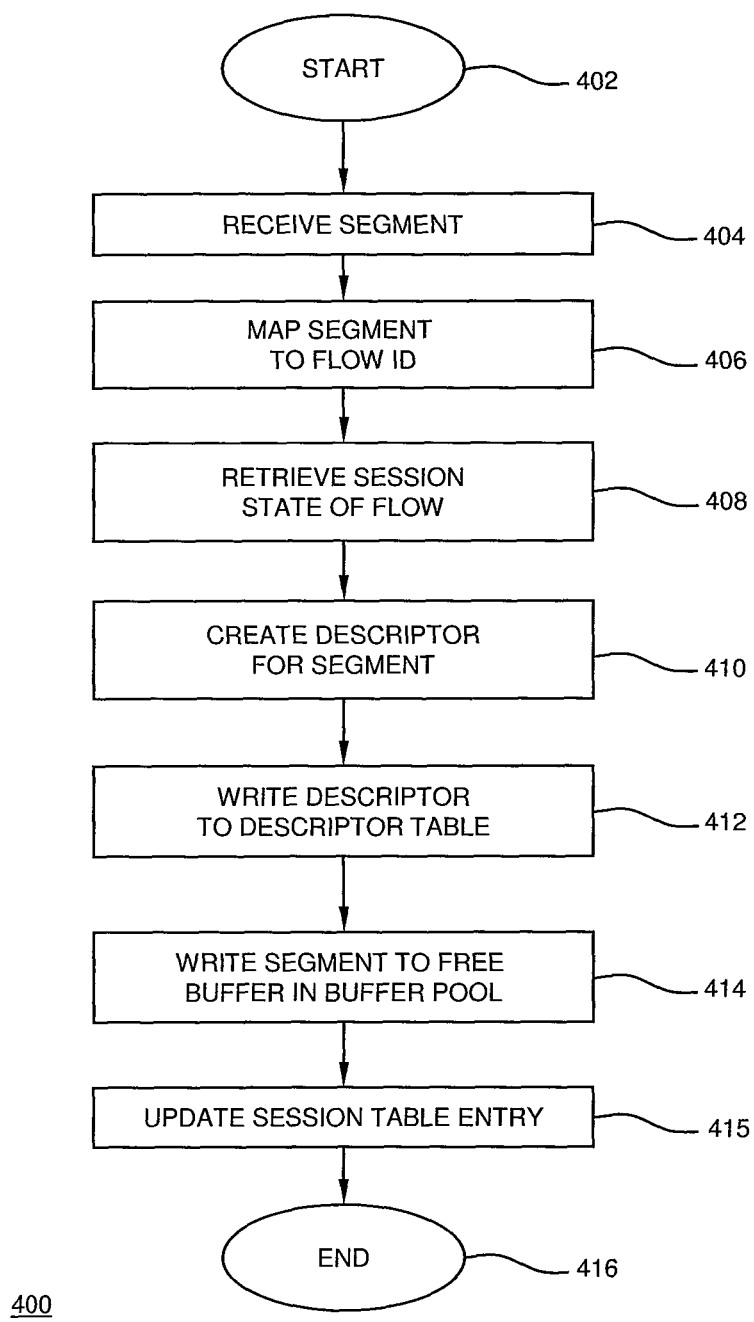
FIG. 4 is a flow diagram illustrating an example method for reordering segments from a segmented data stream.

FIG. 4 is a flow diagram illustrating an example method 400 for reordering segments from a segmented data stream. The method 400 starts at step 402 and proceeds to step 404. At step 404, a segment of a segmented data stream is received, where the segmented data stream is comprised of a plurality of segmented service flows. The segment may be received by a CM, such as the CM 104 of FIG. 1, and/or by a CMTS, such as the CMTS 105 of FIG. 1.

At step 406, the segment is mapped to a Flow ID uniquely identifying a service flow, such as a service flow 117, from which the segment originated. The Flow ID may be determined based on a channel ID and SID of the segment, where a flow table, such as the flow table 302, associates the channel ID and SID with the corresponding Flow ID.

At step 408, the session state for the corresponding service flow 117 of the segment is retrieved. For example, the session state may be retrieved from a session table, such as the session table 312 of the FIG. 3, based on the Flow ID. The method 400 proceeds to step 410. At step 410, descriptor information for the segment is created.

At step 412, the descriptor is stored; for example, the descriptor may be written in a descriptor entry of a descriptor table, such as the descriptor entry 326 of the descriptor table 322 of FIG. 3. The descriptor is written in a descriptor entry in accordance with the Flow ID and sequence number of the segment. Descriptors for consecutive segments having the same Flow ID are written in consecutive descriptor entries; therefore, the order of the descriptor entries identifies the original order of the segments corresponding to a particular service flow.

At step 414, the segment is written to a buffer, such as the buffer 218 of FIG. 3. The buffer is allocated dynamically to each segment independently of the corresponding Flow ID. The method 400 proceeds to step 415, where the corresponding session table entry is updated to indicate whether the associated service flow requires processing by a segment scheduler module, such as the segment scheduler module 212. The method 400 then ends at step 416.

Figure 5A:
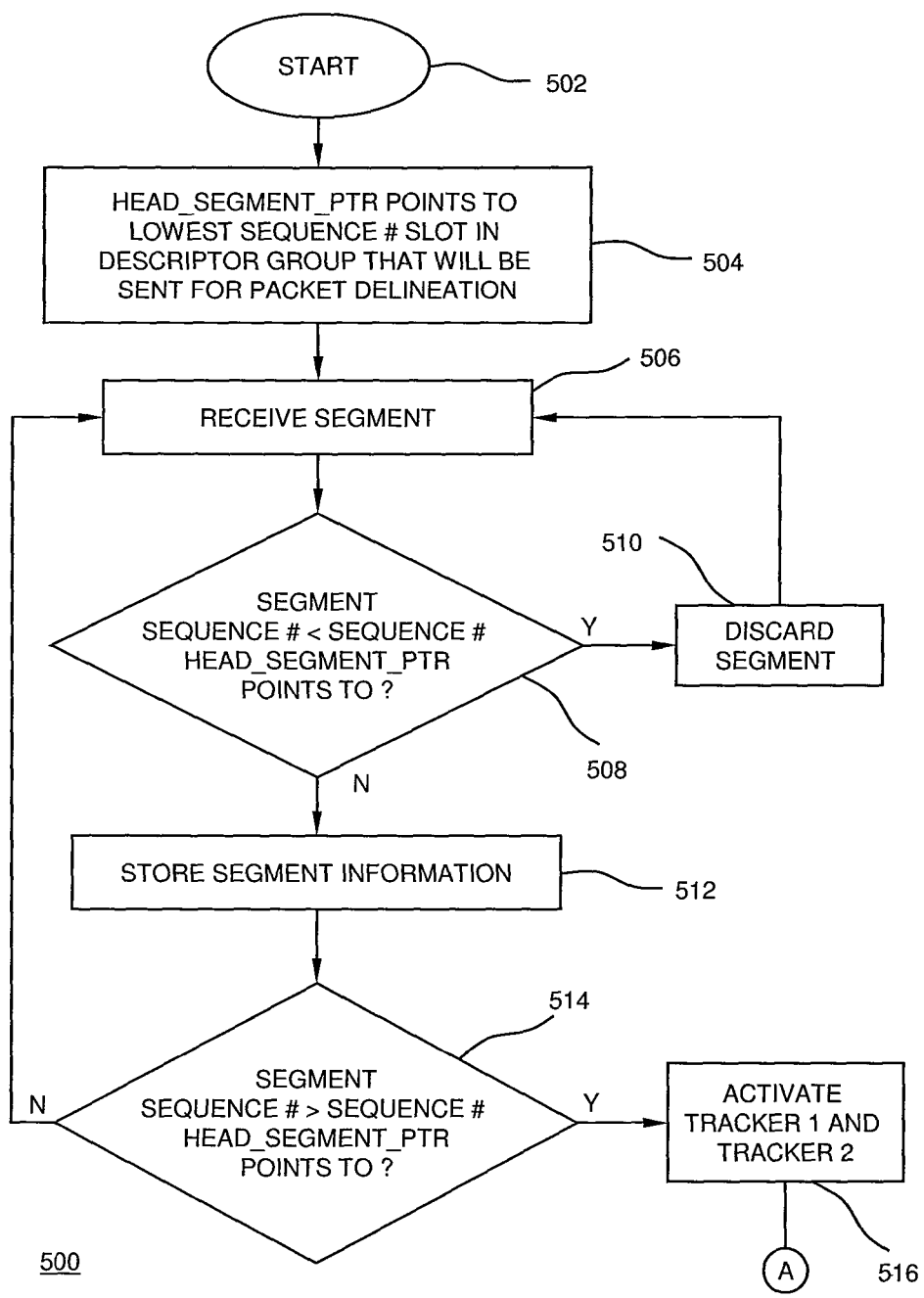
FIGS. 5A, 5B, and 5C are flow diagrams illustrating an example method for determining a timeout when re-ordering segments associated with a particular service flow.
Figure 5B:
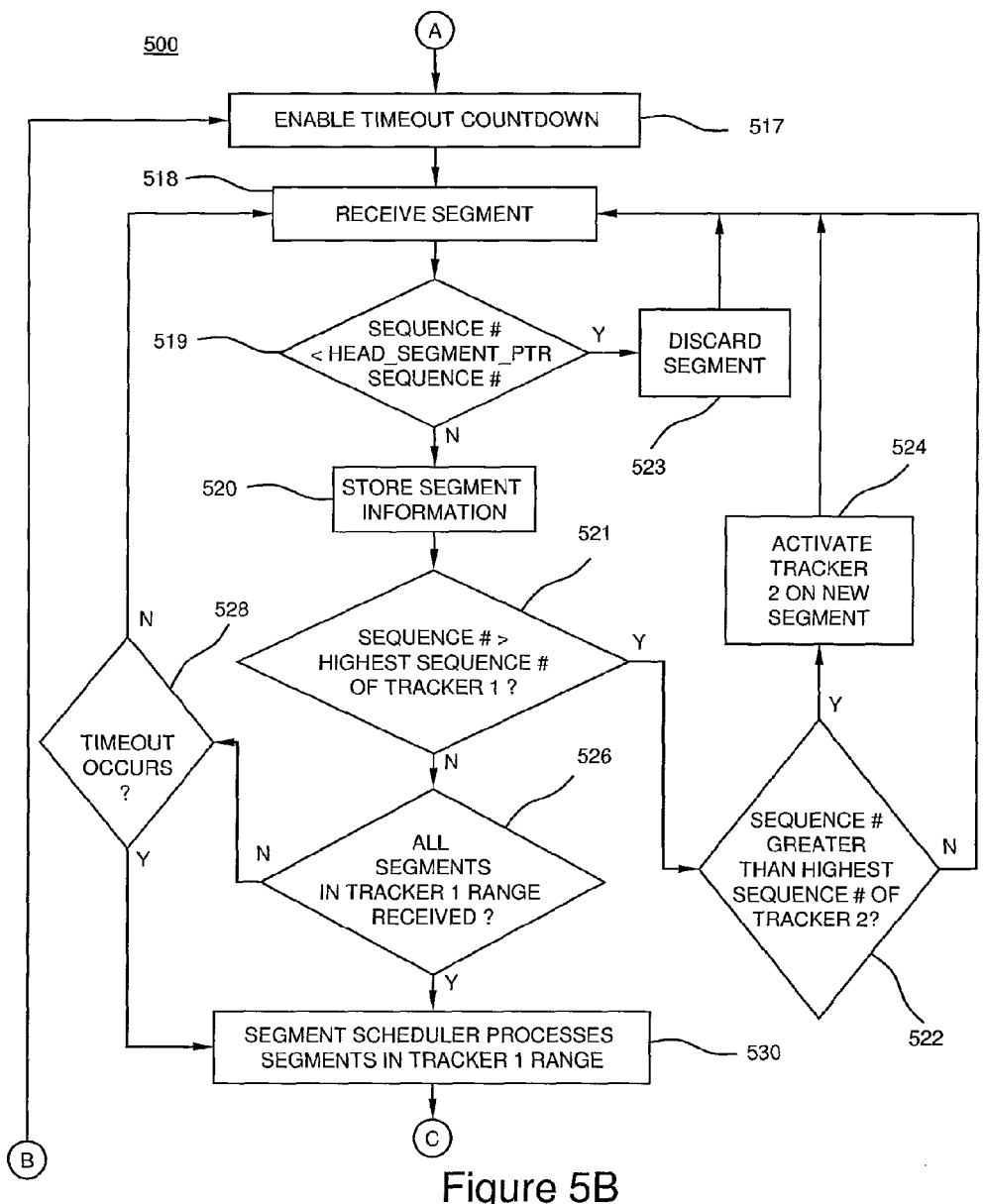
Figure 5C:
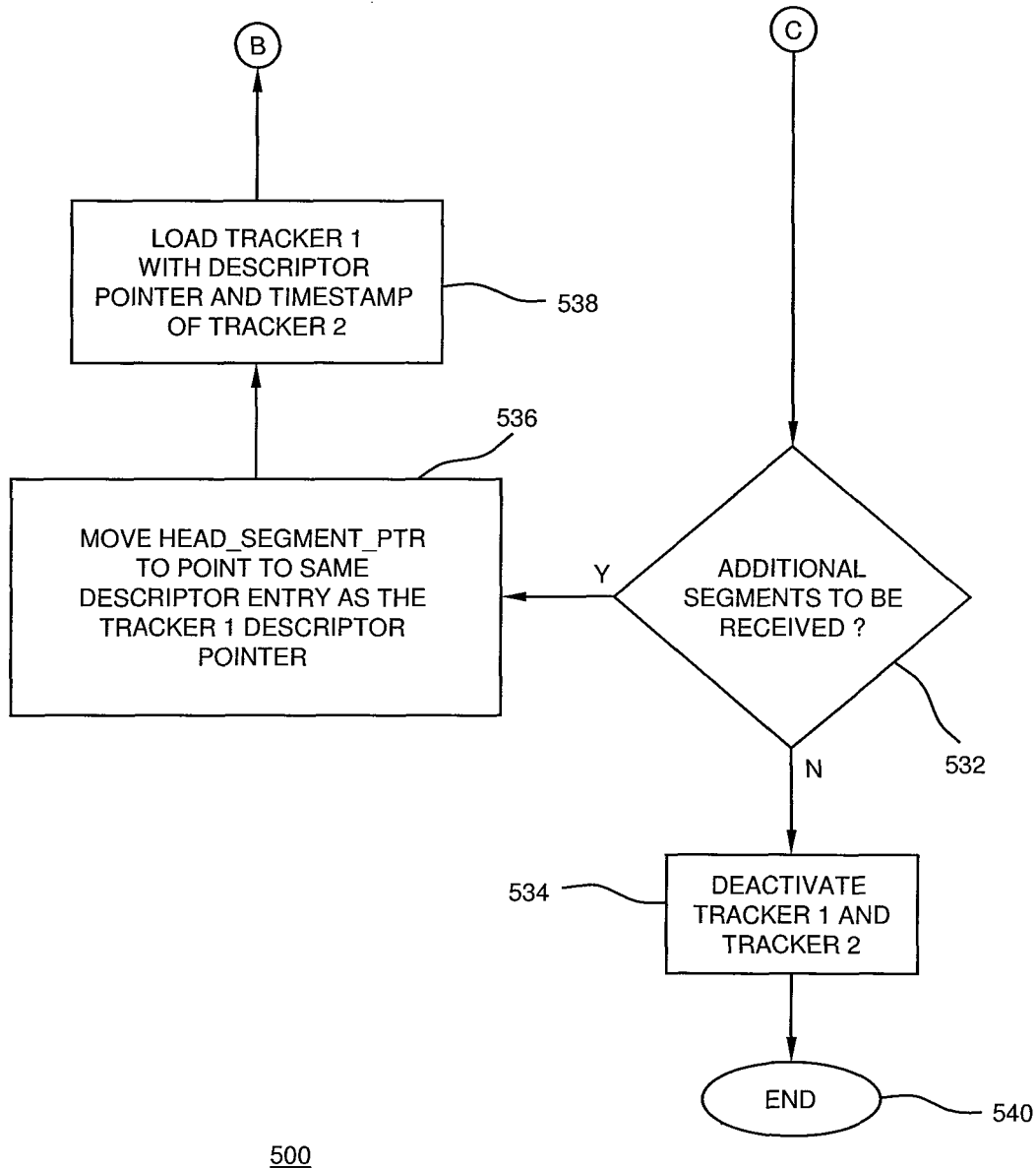

FIGS. 5A, 5B, and 5C are flow diagrams illustrating an example method 500 for determining a timeout when re-ordering segments associated with a particular service flow. The method 500 may be utilized for determining customized timeouts during segment re-ordering for each service flow managed by a CMTS and/or CM.

The method 500 starts at step 502 and proceeds to step 504. At step 504, a head segment pointer points to a descriptor entry of the descriptor group corresponding to the particular service flow of interest, where the descriptor entry identified by the head segment pointer corresponds to the lowest expected segment sequence number. The head segment pointer may be contained within a session entry of a session table, such as a session entry 314 of a session table 312.

At step 506, a segment corresponding to the particular service flow of interest is received. At step 508, a determination is made as to whether the sequence number of the segment is less than the sequence number associated with the descriptor entry identified by the head segment pointer. If this condition is met (option "YES"), the method 500 proceeds to step 510, where the segment is discarded. If the condition at step 508 is not met (option "NO"), the method 500 proceeds to step 512.

At step 512, the segment and related information, such as the descriptor for the segment, are stored as described above in the method 400. At step 514, a determination is made as to whether the sequence number of the segment is greater than the sequence number associated with the descriptor entry identified by the head segment pointer. If it is determined that this condition is not met (option "NO"), the method 500 returns to step 506. If this condition is met (option "YES"), the method 500 proceeds to step 516.

At step 516, a first tracker, i.e., Tracker 1, and a second tracker, i.e., Tracker 2, are activated. Each tracker consists of a descriptor pointer identifying a descriptor entry of the descriptor group associated with the service flow of interest, and a timestamp. The trackers and their associated information (i.e., the descriptor pointers and timestamp values) may be managed in the session entry. The timestamps of each tracker are utilized to determine when a "timeout" occurs and a range of re-ordered segments should be examined and scheduled by a segment scheduler for packet retrieval.

When Tracker 1 and Tracker 2 are activated at step 516, their corresponding time stamps are loaded with the latest "current time", where the "current time" is maintained in a real-time counter that counts up at a pre-determined clock rate. For example, each timestamp is loaded with a time $T_0$ when they are activated at step 516. Additionally, when the trackers are activated at step 516 the descriptor pointers of each tracker point to the descriptor entry following the descriptor entry for the received segment. Thus, Tracker 1 defines a range of segment sequence numbers, ranging from the sequence number associated with the descriptor entry identified by the head segment pointer up to, but not including, the sequence number associated with the descriptor entry identified by the Tracker 1 descriptor pointer. Alternatively, Tracker 2 will dynamically track a second range of segment sequence numbers defined by the highest received segment sequence number, as further described below. Additional trackers may also be utilized to track timeouts for additional ranges of segment sequence numbers.

Once activated, the Tracker 1 contents (i.e., the descriptor pointer and timestamp) are locked until the segments with sequence numbers within the range defined by Tracker 1 are all received or a timeout occurs. The current states of Tracker 1 and Tracker 2 (i.e., the current timestamps and descriptor pointers) may be updated in the session entry of the session table.

At step 517, a timeout period is enabled, activating a countdown to a timeout based on the Tracker 1 timestamp, for example $T_0$, and a pre-determined timeout time $T_{out}$. At step 518, a new segment corresponding to the particular service flow of interest is received. At step 519, a determination is made as to whether the new segment sequence number is less than the sequence number associated with the descriptor entry identified by the head segment pointer. If this condition is met (option "YES"), the method 500 proceeds to step 523, where the segment is discarded. If the condition at step 519 is not met (option "NO"), the method 500 proceeds to step 520. At step 520, the segment and related information, such as the descriptor for the segment, are stored as described above in the method 400.

At step 521, a determination is made as to whether the new segment sequence number is greater than the sequence number associated with the descriptor entry identified by the Tracker 1 descriptor pointer. If this condition is met (option "YES"), the method 500 proceeds to step 522. At step 522, a determination is made as to whether the new segment sequence number is greater than the sequence number associated with the descriptor entry identified by the Tracker 2 descriptor pointer. If this condition is not met (option "NO"), the method 500 returns to step 518. If the condition at step 522 is met (option "YES"), then the method 500 proceeds to step 524. At the step 524, Tracker 2 is activated again; thus, the Tracker 2 timestamp is loaded with the latest current time, for example $T_2$, and the Tracker 2 descriptor pointer points to the descriptor entry following the descriptor entry for the new segment. The current state of Tracker 2 may be updated in the session entry of the session table. The method 500 then returns to step 518.

If, at step 521, the condition is not met (option "NO"), the method 500 proceeds to step 526. At the step 526, a determination is made as to whether all segments with sequence numbers within the range defined by Tracker 1 have been received. If this condition is not met (option "NO"), the method 500 proceeds to step 528. At step 528, a determination is made as to whether the timeout period has elapsed. For example, if the time $T_0+T_{out}$ is equal to or exceeds the latest current time, the timeout period has elapsed and a timeout occurs. Alternatively, if the time $T_0+T_{out}$ is less than the latest current time, the timeout period has not elapsed. If, at step 528, the condition is not met (option "NO"), the method 500 returns to step 518. If, at step 528, the condition is met (option "YES"), the method 500 proceeds to step 530.

If, at step 526, the condition is met (option "YES"), the method 500 proceeds to step 530. At step 530, a segment scheduler, such as the segment scheduler module 212 of FIG. 3, processes the received segments with sequence numbers within the range defined by Tracker 1, as further described below in relation to FIG. 6. At step 532, a determination is made as to whether additional segments will be received. If this condition is met (option "YES"), the method 500 proceeds to step 536. At step 536, the head segment pointer is moved to point to the same descriptor entry as the Tracker 1 descriptor pointer; for example, the contents of the Tracker 1 descriptor pointer are copied to the head segment pointer. At step 538, the Tracker 1 descriptor pointer and timestamp are loaded with the Tracker 2 descriptor pointer and timestamp, respectively. The current state of Tracker 1 may be updated in the session entry of the session table. The method then returns to step 517.

If, at step 532, it is determined that additional segments will not be received (option "NO"), the method 500 proceeds to step 534, where Tracker 1 and Tracker 2 are deactivated. The method 500 then proceeds to step 540 where it ends.

Figure 6A:
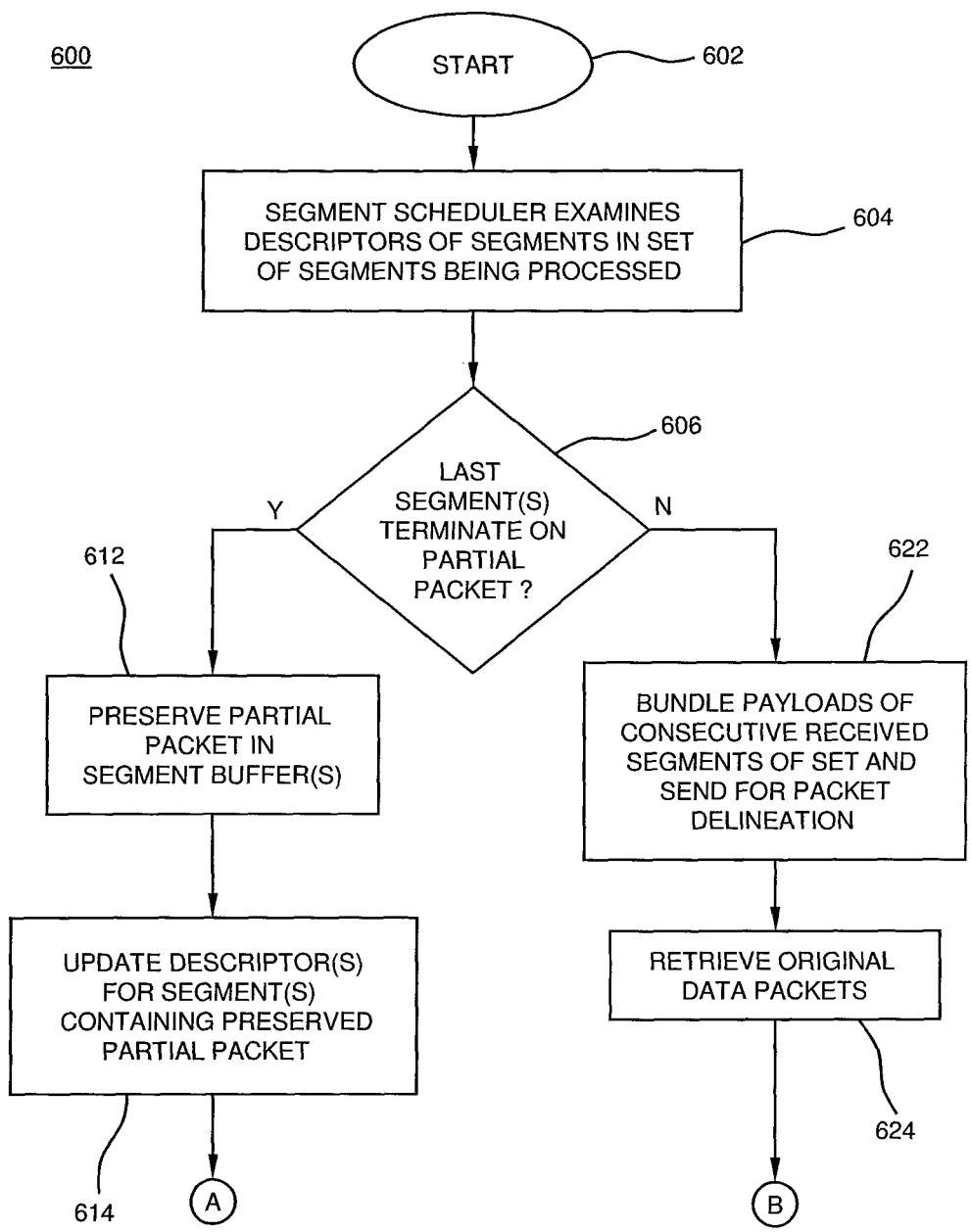
FIGS. 6A and 6B are flow diagrams illustrating an example method 600 for retrieving at least one data packet from a set of re-ordered segments.
Figure 6B:
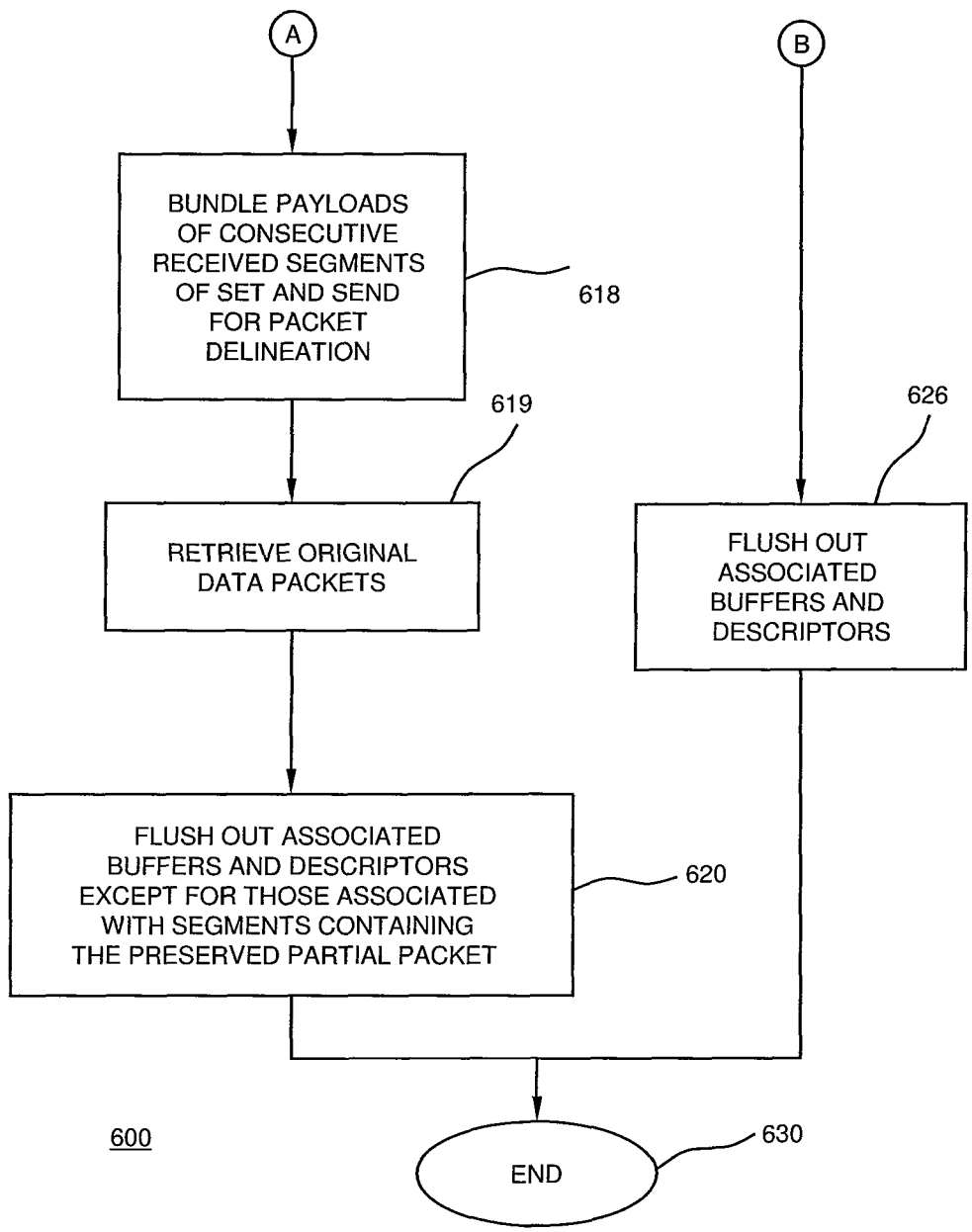

FIGS. 6A and 6B are flow diagrams illustrating an example method 600 for retrieving at least one data packet from a set of re-ordered segments. The method 600 starts at step 602 and proceeds to step 604. At step 604, a segment scheduler, such as the segment scheduler module 212 of FIG. 2, examines the descriptors of a set of segments having sequence numbers within a range defined by a first tracker as described above in the method 500. Additionally, the set may include one or more segments containing a partial packet preserved during previous segment scheduling by the segment scheduler. The descriptors may be located in descriptor entries of a descriptor table, such as descriptor entries 326 of the descriptor table 322 of FIG. 3.

At step 606, a determination is made as to whether the last segment in the set terminates on a partial data packet; additionally, it may be determined that the partial data packet spans multiple segments. If this condition is met (option "YES"), the method proceeds to step 612.

At step 612, the partial packet is preserved in the buffers, such as the buffers 218 of FIG. 3, of the corresponding segments that contain the partial packet. At step 614, the descriptors of the segments containing the partial packet are updated to reflect the information related to the preserved partial packet. Additionally, the corresponding descriptor entries are updated with the updated descriptors.

At step 618, utilizing the descriptors to identify packet boundaries within the segments, the segment scheduler bundles the complete payloads of consecutive received segments of the set and sends the bundles to a packet delineator, such as the packet delineation module 214, for packet retrieval. Each bundle always starts with the beginning of a packet and ends on a packet boundary. Thus, each bundle received by the packet delineator is a series of complete packets, and no additional buffering is required during packet delineation for partial packets.

The method 600 proceeds to step 619, where the packet delineator retrieves the original data packets from the bundles sent by the segment scheduler. At step 620, the buffers and descriptor entries associated with the segments containing the preserved partial packet are maintained, and the buffers and descriptor entries associated with the remaining segments in the set are flushed out and available for re-use by newly received segments. The method 600 further proceeds to step 630, where the method 600 ends.

If, at step 606, the condition is not met (option "NO"), the method 600 proceeds to step 622. At step 622, utilizing the descriptors to identify packet boundaries within the segments, the segment scheduler bundles the complete payloads of consecutive received segments of the set and sends the bundles to the packet delineator. At step 624, the packet delineator retrieves the original data packets from the bundles sent by the segment scheduler. As described above, each bundle always starts with the beginning of a packet and ends on a packet boundary. Thus, each bundle received by the packet delineator is a series of complete packets, and no additional buffering is required during packet delineation for partial packets. At step 626, the buffers and descriptor entries associated with the set of segments are flushed out and available for re-use by newly received segments. The method 600 then proceeds to step 630, where the method 600 ends.

Variations of the method and apparatus described above are possible without departing from the scope of the invention. In view of the wide variety of embodiments that can be applied, it should be understood that the illustrated embodiments are exemplary only, and should not be taken as limiting the scope of the following claims.

The invention claimed is:

1. A method comprising:
   receiving, via a plurality of radio frequency (RF) channels, a plurality of segments associated with a service flow, wherein the service flow comprises a plurality of discrete data packets and wherein one or more of the plurality of segments includes at least a portion of two or more different data packets separated by a packet boundary;

mapping each of the plurality of segments to a unique flow identifier (ID) based on an RF channel ID and a service ID of the service flow;

generating a descriptor for each of the plurality of segments, wherein each generated descriptor identifies a storage location of a segment associated with the descriptor and identifies any packet boundaries between portions of different data packets included in the segment;

storing the descriptor in a buffer corresponding to the unique flow identifier at a location in the buffer that corresponds to a sequence number associated with each of the plurality of segments that indicates an original order of segments of the service flow;

re-ordering the plurality segments based on the locations in the buffer of the stored descriptors and the storage locations contained within the descriptors to generate re-ordered segments, wherein the re-ordered segments are in the original order;

initializing first and second timeout trackers each comprising a descriptor pointer identifying a descriptor associated with the service flow and a timestamp;

determining, based on a timeout process using the first and second timeout trackers together, a range of re-ordered segments for examination, wherein at least one of the segments in the range of re-ordered segments includes a packet boundary between portions of different data packets included in the at least one segment;

examining descriptors associated with a set of re-ordered segments in the range of re-ordered segments to detect if the set of re-ordered segments is ready for packet retrieval of at least a first packet based on the packet boundaries contained within the descriptors; and processing the set of re-ordered segments to obtain the at least first packet when it is detected that the set of re-ordered segments is ready for packet retrieval.

2. The method of claim 1, wherein generating comprises generating the descriptor comprising information configured to indicate segment validity and a packet structure within a segment.

3. The method of claim 1, further comprising:
storing a current state pertaining to the re-ordering of segments as a session entry in a session table; and
managing resources for segment reordering based on the session entry.

4. An apparatus, comprising:
a transceiver configured to receive a plurality of radio frequency (RF) channels; a demodulator configured to demodulate the plurality of radio frequency (RF) channels to obtain a plurality of segments associated with a service flow, wherein the service flow comprises a plurality of discrete data packets and wherein one or more of the plurality of segments includes at least a portion of two or more different data packets separated by a packet boundary; and
a processor configured to:
map each of the plurality of segments to a unique flow identifier (ID) based on an RF channel ID and a service ID of the service flow;
generate a descriptor for each of the plurality of segments, wherein each descriptor identifies a storage location of a segment associated with the descriptor and identifies any packet boundaries between portions of different data packets included in the segment;
store the descriptor in a buffer corresponding to the unique flow identifier at a location in the buffer that corresponds to a sequence number associated with each of the plurality of segments that indicates an original order of segments of the service flow;
re-order the plurality segments based on the locations in the buffer of the stored descriptors and the storage locations contained within the descriptors to generate re-ordered segments, wherein the re-ordered segments are in the original order;
initialize first and second timeout trackers each comprising a descriptor pointer identifying a descriptor associated with the service flow and a timestamp;
determine, based on a timeout process using the first and second timeout trackers together, a range of re-ordered segments for examination, wherein at least one of the segments in the range of re-ordered segments includes a packet boundary between portions of different data packets included in the at least one segment;
examine descriptors associated with a set of re-ordered segments in the range of re-ordered segments to detect if the set of re-ordered segments is ready for packet retrieval of at least a first packet based on the packet boundaries contained within the descriptors; and
process the set of re-ordered segments to obtain at the least first packet when it is detected that the set of re-ordered segments is ready for packet retrieval.

5. A system comprising:
at least one cable modem configured to:
generate a plurality of segments from a service flow, wherein the service flow comprises a plurality of discrete data packets and wherein one or more of the plurality of segments includes at least a portion of two or more different data packets separated by a packet boundary;
transmit the plurality of segments via a plurality of radio frequency (RF) channels;
a cable modem termination sub-system configured to:
receive the plurality of segments via the plurality of radio frequency (RF) channels;
map each of the plurality of segments to a unique flow identifier (ID) based on an RF channel ID and a service ID of the service flow;
generate a descriptor for each of the plurality of segments, wherein each descriptor identifies a storage location of a segment associated with the descriptor and identifies any packet boundaries between portions of different data packets included in the segment;
store the descriptor in a buffer corresponding to the unique flow identifier at a location in the buffer that corresponds to a sequence number associated with each of the plurality of segments that indicates an original order of segments of the service flow;
re-order the plurality segments based on the locations in the buffer of the stored descriptors and the storage locations contained within the descriptors to generate re-ordered segments, wherein the re-ordered segments are in the original order;
initialize first and second timeout trackers each comprising a descriptor pointer identifying a descriptor associated with the service flow and a timestamp;
determine, based on a timeout process using the first and second timeout trackers together, a range of re-ordered segments for examination, wherein at least one of the segments in the range of re-ordered segments includes a packet boundary between portions of different data packets included in the at least one segment;
examine descriptors associated with a set of re-ordered segments in the range of re-ordered segments to detect if the set of re-ordered segments is ready for packet retrieval of at least a first packet based on the packet boundaries contained within the descriptors; and process the set of re-ordered segments to obtain the at least first packet when it is detected that the set of re-ordered segments is ready for packet retrieval.

6. The method of claim 1, wherein receiving comprises receiving the plurality of segments that were segmented from the service flow with a variable byte length.

7. The method of claim 1, wherein storing comprises storing the descriptor in the buffer in a descriptor table configured as a circular buffer and further comprising flushing out a portion of the circular buffer corresponding to the processed set of re-ordered segments, wherein the portion becomes available to store descriptors for newly received segments and wherein processing comprises processing sets of segments according to a first-in-first-out (FIFO) scheme.

8. The method of claim 7, further comprising:
storing each of the plurality of segments in an arbitrary free buffer of a buffer pool; and
storing the location in the buffer pool of each of the plurality of segments in the descriptor table as part of a corresponding descriptor.

9. The method of claim 8, further comprising:
determining if the processed set of re-ordered segments results in a remainder of a partial packet associated with a second packet; and
preserving the segments associated with the remainder of the partial packet in the buffer pool for processing with a next set of segments.

10. The method of claim 1, wherein determining the range of re-ordered segments based on the timeout process comprises:
initializing the first timeout tracker that includes a first pointer to a beginning descriptor associated with the range of re-ordered segments;
initializing the second timeout tracker that includes a second pointer to an ending descriptor associated with the range of re-ordered segments;
initializing a first timer to a current time; determining if all of the segments associated with the range of segments have been received before the first timer reaches a predetermined time, wherein the range of segments begins at the first pointer and ends at the second pointer; and
in response to determining that all of the segments have been received, beginning the processing of the set of re-ordered segments.

11. The method of claim 10, further comprising:
receiving a segment associated with the service flow with a sequence number that is greater than a sequence number associated with a segment corresponding to the second pointer;
initializing a third timeout tracker that includes a third pointer to a descriptor that is one greater than a descriptor for the segment;
initializing a second timer to a current time;
determining if all of the segments associated with a range of re-ordered segments between the second pointer and the third pointer have been received before the second timer reaches a predetermined time; and
in response to determining that all of the segments between the second pointer and the third pointer have been received, processing the re-ordered segments between the second pointer and the third pointer.

12. The apparatus of claim 4, wherein the demodulator is configured to obtain the plurality of segments that were segmented from the service flow with a variable byte length.

13. The apparatus of claim 4, wherein the processor is configured to store the descriptor in the buffer in a descriptor table configured as a circular buffer and further configured to flush out a portion of the circular buffer corresponding to the processed set of re-ordered segments, wherein the portion becomes available to store descriptors for newly received segments and the processor is configured to process sets of segments according to a first-in-first-out (FIFO) scheme.

14. The apparatus of claim 13, wherein the processor is further configured to:
store each of the plurality of segments in an arbitrary free buffer of a buffer pool; and
store the location in the buffer pool of each of the plurality of segments in the descriptor table along as part of a corresponding descriptor.

15. The apparatus of claim 14, wherein the processor is further configured to:
determine if the processed set of re-ordered segments results in a remainder of a partial packet associated with a second packet; and
preserve the segments associated with the remainder of the partial packet in the buffer pool for processing with a next set of segments.

16. The apparatus of claim 4, wherein the processor is further configured to:
initialize the first timeout tracker that includes a first pointer to a beginning descriptor associated with the range of re-ordered segments;
initialize the second timeout tracker that includes a second pointer to an ending descriptor associated with the range of re-ordered segments;
initialize a first timer to a current time;
determine if all of the segments associated with the range of segments have been received before the first timer reaches a predetermined time, wherein the range of segments begins at the first pointer and ends at the second pointer; and
begin the processing of the set of re-ordered segments in response to determining that all of the segments have been received.

17. The apparatus of claim 16, wherein the processor is further configured to:
receive a segment associated with the service flow with a sequence number that is greater than a sequence number associated with a segment corresponding to the second pointer;
initialize a third timeout tracker that includes a third pointer to a descriptor that is one greater than a descriptor for the segment;
initialize a second timer to a current time;
determine if all of the segments associated with a range of re-ordered segments between the second pointer and the third pointer have been received before the second timer reaches a predetermined time; and
process the re-ordered segments between the second pointer and the third pointer in response to determining that all of the segments between the second pointer and the third pointer have been received.

18. The apparatus of claim 4, wherein the processor is further configured to:
store a current state pertaining to the re-ordering of segments as a session entry in a session table; and
manage resources for segment reordering based on the session entry.

19. The system of claim 5, wherein the cable modem termination sub-system is configured to store the descriptor in the buffer in a descriptor table configured as a circular buffer and is further configured to flush out a portion of the circular buffer corresponding to the processed set of re-ordered segments, wherein the portion becomes available to store descriptors for newly received segments and the cable modem termination sub-system is configured to process sets of segments according to a first-in-first-out (FIFO) scheme.

20. The system of claim 5, wherein the cable modem termination sub-system is further configured to:
- initialize the first timeout tracker that includes a first pointer to a beginning descriptor associated with the range of re-ordered segments;
- initialize the second timeout tracker that includes a second pointer to an ending descriptor associated with the range of re-ordered segments;
- initialize a first timer to a current time; determine if all of the segments associated with the range of segments for the set of re-ordered segments have been received before the first timer reaches a predetermined time, wherein the range of segments begins at the first pointer and ends at the second pointer; and
- begin the processing of the set of re-ordered segments in response to determining that all of the segments have been received.

* * * * *